(12) United States Patent
Ravenet

(10) Patent No.: US 9,406,410 B2
(45) Date of Patent: Aug. 2, 2016

(54) NUCLEAR FUEL ROD AND METHOD OF MANUFACTURING PELLETS FOR SUCH A ROD

(75) Inventor: Alain Ravenet, Vinon sur Verdon (FR)

(73) Assignee: Commissariat a L'Energie Atomique et aux Energies Alternatives, Paris (FR)

( * ) Notice: Subject to any disclaimer, the term of this patent is extended or adjusted under 35 U.S.C. 154(b) by 829 days.

(21) Appl. No.: 13/513,849

(22) PCT Filed: Dec. 1, 2010

(86) PCT No.: PCT/EP2010/068611
§ 371 (c)(1),
(2), (4) Date: Aug. 8, 2012

(87) PCT Pub. No.: WO2011/067274
PCT Pub. Date: Jun. 9, 2011

(65) Prior Publication Data
US 2012/0321031 A1 Dec. 20, 2012

(30) Foreign Application Priority Data

Dec. 4, 2009 (FR) .................................. 09 58661

(51) Int. Cl.
*G21C 3/00* (2006.01)
*G21C 21/02* (2006.01)
*G21C 3/06* (2006.01)
(Continued)

(52) U.S. Cl.
CPC *G21C 21/02* (2013.01); *G21C 3/06* (2013.01); *G21C 3/18* (2013.01); *G21C 3/07* (2013.01); *G21C 3/60* (2013.01); *G21C 3/623* (2013.01);
(Continued)

(58) Field of Classification Search
CPC .................... G21C 2003/045; G21C 2003/048; G21C 3/58
See application file for complete search history.

(56) References Cited

U.S. PATENT DOCUMENTS 3,133,000 A * 5/1964 Hartnell-Beavis ....... G21C 3/06
376/361
3,575,803 A 4/1971 Greebler
(Continued)

FOREIGN PATENT DOCUMENTS

DE 2152132 A1 4/1973
EP 0370884 A1 5/1990
(Continued)

OTHER PUBLICATIONS

Golovnin, I. S., et al. "Computer Code for Strain-Stress Behaviour and Collapse of Power Reactor Fuel Clads", Res Mechanica, vol. 21. No. 2, 1987, pp. 97-107.
(Continued)

*Primary Examiner* — Marshall O'Connor
(74) *Attorney, Agent, or Firm* — Nixon Peabody LLP; Khaled Shami

(57) ABSTRACT

A new type of nuclear fuel rods. The rod cladding has an elliptical section transverse to its longitudinal direction and each nuclear fuel pellet has a truncated elliptical shape along the major axis of the cladding, the minor axis of the pellets is the same as the length of the minor axis of the cladding except for the assembly clearance j, the difference in length between the major axis of the cladding and the truncated major axis of the pellets is very much larger than the assembly clearance j. Also disclosed is a method of manufacturing nuclear fuel rods and stacking them in the cladding so as to form a nuclear fuel rod.

5 Claims, 2 Drawing Sheets

(51) Int. Cl.
  *G21C 3/18* (2006.01)
  *G21C 3/04* (2006.01)
  *G21C 3/07* (2006.01)
  *G21C 3/60* (2006.01)
  *G21C 3/62* (2006.01)

(52) U.S. Cl.
  CPC ........... *G21C 2003/048* (2013.01); *Y02E 30/40* (2013.01)

(56) References Cited

U.S. PATENT DOCUMENTS

| | | | |
|---|---|---|---|
| 4,957,696 | A | 9/1990 | Marechal et al. |
| 6,014,418 | A | 1/2000 | Isobe et al. |
| 2008/0185743 | A1 | 8/2008 | Yang et al. |

FOREIGN PATENT DOCUMENTS

| | | | | |
|---|---|---|---|---|
| GB | 989889 | A | | 4/1965 |
| GB | 1271644 | A | | 4/1972 |
| JP | 51-35884 | | * 3/1976 | ............... G21C 3/16 |
| JP | 51-35884 | A | | 3/1976 |
| JP | S58-142293 | A | | 8/1983 |
| JP | 4-164291 | A | | 6/1992 |
| JP | H11-202073 | A | | 7/1999 |
| JP | 2000-502809 | A | | 3/2000 |
| JP | 2006234719 | A | | 9/2006 |
| JP | 2006284489 | A | | 10/2006 |
| WO | 2007/017503 | A1 | | 2/2007 |

OTHER PUBLICATIONS

Ninokata, H., et al. "Development of a Numerical Experimentation Method for Thermal Hydraulics Design and Evaluation of High Burn-Up and Innovative Fuel Pins", Japan Nuclear Cycle Development Inst., Tokai, Ibaraki (Japan), Mar. 2003, JNC-TY-9400-2003-010.

Ramachandran, R., et al. "Fuel Pellets of Various Shapes—Fabrication Experience", Bhabha Atomic Research Centre, Mumbai (India), Oct. 1996.

Shcheglov, A. S. "Effects of fuel-cladding eccentricity, can ovality and fuel pellet spalling on temperature distribution in a fuel element", Atomnaya Ehnergiya (USSR), vol. 67:3, Sep. 1989, pp. 204-207.

Singhal, N. C., et al. "Influence of Pellet Shapes on Sheath Strains: Elestres Prediction vs Irradiation Measurements", 15th Annual Nuclear Simulation Symposium, Mississauga, Ontario (Canada), May 1-2, 1989.

Taboada, H. H., et al. "Comparison Study on the Thermal Behavior of Elliptical and Circular Cross Section Fuel Rod", Proceedings of the 11. ENFIR: Meeting on reactor physics and thermal hydraulics, 1997, 838 p. pp. 757-762.

Taboada, H. H., et al. "Elliptical cross section fuel rod study II", Proceedings of the International Conference on Nuclear Power Competitiveness in the Next Two Decades, Buenos Aires (Argentina), Asociacion Argentina de Tecnologia Nuclear, 1996, 335 p., pp. 64-71.

Preliminary Search Report for French Patent Application No. 0958661, dated Jul. 26, 2010.

International Search Report and Written Opinion for PCT/EP2010/068611 dated Mar. 9, 2011.

Decision of Rejection, dated Dec. 1, 2015, issued in Japanese Patent Application No. 2012-541482, 5 pages.

Notice of Allowance, dated Jun. 8, 2016, issued in Japanese Patent Application No. 2012-541482, 3 pages.

* cited by examiner

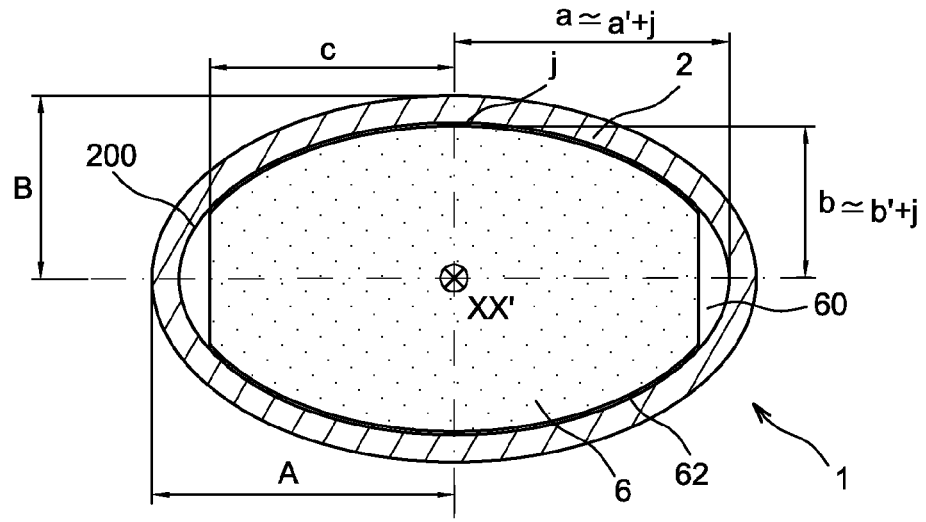
FIG. 1A
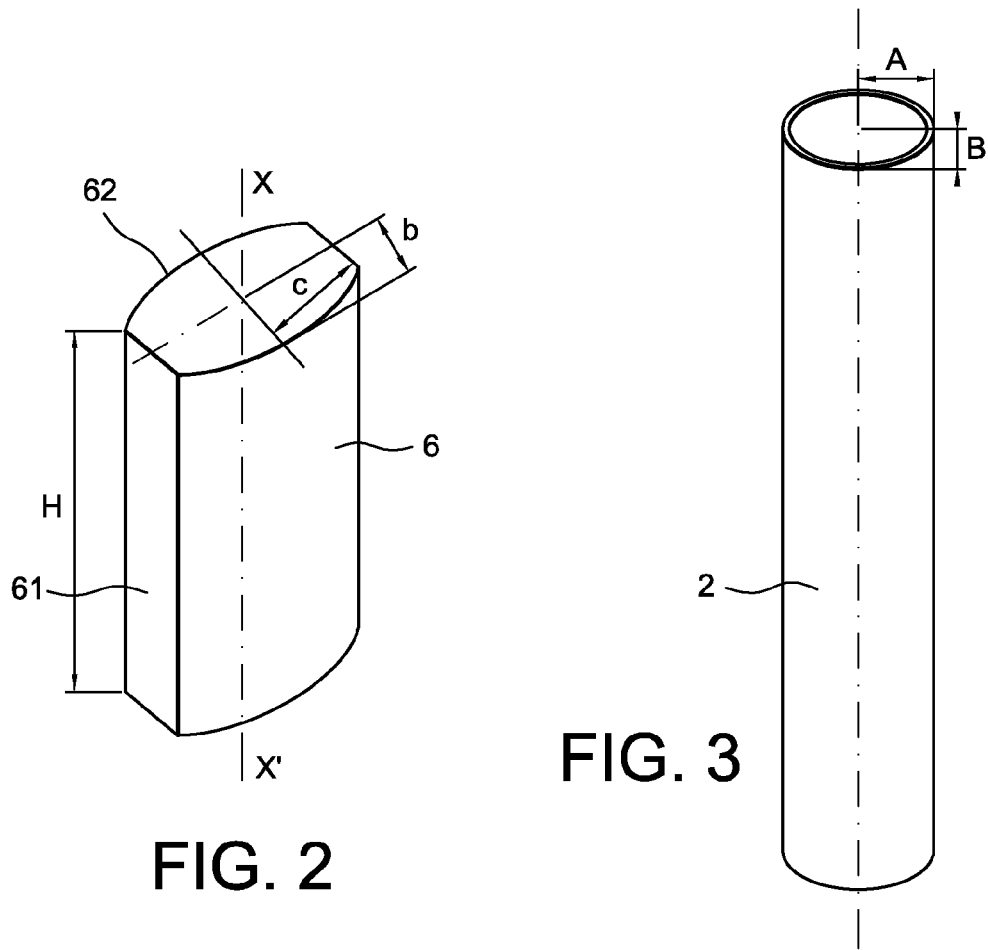
FIG. 2
FIG. 3

NUCLEAR FUEL ROD AND METHOD OF MANUFACTURING PELLETS FOR SUCH A ROD

CROSS REFERENCE TO RELATED APPLICATIONS OR PRIORITY CLAIM

This application is a National Phase of PCT/EP2010/068611, filed Dec. 1, 2010, entitled, "NUCLEAR FUEL ROD AND METHOD FOR MANUFACTURING PELLETS FOR SUCH A FUEL ROD", which claims the benefit of French Patent Application No. 09 58661, filed Dec. 4, 2009, the contents of which are incorporated herein by reference in their entirety.

TECHNICAL FIELD

The invention relates to a new type of nuclear fuel rod.

Applications targeted for this new type of nuclear fuel rod include nuclear Pressurised Water Reactors (PWR) and Gas-Cooled Fast Reactors (GCFR), called $4^{th}$ generation reactors.

For the purposes of this entire application, "nuclear reactors" refer to the normal sense of this term at the present time, namely power stations generating energy based on nuclear fission reactions using fuel elements in which fission reactions occur that release power in the form of heat, this power being extracted from elements by heat exchange with a coolant that cools the elements.

For the purposes of this entire application, "nuclear fuel rod" refers to the official sense as defined for example in the Nuclear Sciences and Techniques dictionary, namely a small diameter narrow tube closed at its two ends, forming the core of a nuclear reactor and containing fissile material. This forms a "nuclear fuel pin", for which the preferred term used in the description of this invention is nuclear fuel rod.

The invention thus discloses a new design of nuclear fuel rods with improved thermomechanical behaviour during mechanical interactions between fuel pellets and the cladding.

PRIOR ART

There are different types of fuel elements depending on operating conditions and reactor performances. So-called $3^{rd}$ generation power stations, and particularly PWR reactors, use rod type fuel elements with a circular cross-section.

The inventor has envisaged an improvement to a fuel element concept.

He started by attempting to understand the design principles and identify the functional limits of all known fuel elements.

The main functions that a fuel element has to perform are:
the density of its fissile atoms must be compatible with neutron functioning conditions and the power density per unit volume of the reactive volume,
it must transfer heat between the fuel material and the heat transporting fluid,
it must confine solid and gas fission products released by the fuel during operation of the reactor. Fission reactions within the fuel generate solid and gas fission products that cause potentially significant swelling of the structure of the material. The swelling phenomenon, particularly gaseous, is activated by heat that also induces mechanisms by which fission gases are released outside the fuel material. Therefore the cladding of the fuel element needs to be capable of accommodating these deformations and gaseous releases from the fuel without losing its integrity.

The density of fission reactions within the fuel is directly correlated to the power per unit volume to be evacuated to the coolant through the cladding.

Therefore it is essential to minimise thermal resistance between the heat source and the coolant in order to limit maximum fuel temperature and effects induced by this heat flux; gradient in the materials and differential expansions between the fuel and the cladding.

The density of fissile material in the reactive volume depends principally on the shape of the elements that limits their capability of being arranged in a given volume by aiming at a maximum filling ratio while maintaining the necessary permeability to the coolant to evacuate power generated by the elements with an acceptable pressure loss.

Basic fuel elements conventionally encountered in nuclear installations may be classified into three types, specifically plate type element (all shapes), cylindrical type element slender along the direction of the axis (usually a circular or annular section) that forms an element of a rod, and a spherical type element, usually in the form of a small diameter particle (about a millimeter).

Furthermore, composite fuel elements generated from spherical particles encased in an inert matrix exist in the three geometric forms mentioned above, namely balls, plates and compact shapes in high temperature reactors (HTR).

Each of these three types of fuel elements combines different solutions to the problems that arise and a compromise has to be made between design choices for its operating domain. The operating domain of each fuel element is actually limited by the performances of the selected design.

Thus, plates comprise cladding that behaves like shells with a very high slenderness (ratio between the free length of the shell and its thickness).

Due to its ductility, the geometry of the cladding material adapts itself to the geometry of the central part of the fuel which means that the differential transverse deformations (swelling and expansion) in the fuel material and the cladding can be accommodated, at a very low stress level. However, this plate structure has a poor ability to constrain deformations imposed on it by the fuel in the direction of the thickness due to the very low stiffness of the cladding transverse to its plane. This freedom allows the fuel to deform anisotropically and preferentially in this direction. The structure is also very unstable in buckling in the case in which compression forces are applied in the plane of the structure, either globally or locally (for example at a hot point), particularly in cases in which the fuel core is not connected to the cladding or is only weakly connected to it.

Good thermal contact between the fuel and the cladding is required to keep the fuel within a sufficiently low temperature range so that it does not release its gas fission products under any operating circumstances.

Therefore, plate elements are only used for cold fuels, in other words within the temperature range in which the fuel material does not release its gases and at moderate levels of power per unit volume.

Plate optimisation parameters for a targeted power per unit volume usually apply to the thickness of the plate and the quality of the fuel/cladding contact, control of corrosion of the cladding and non-degradation of its ductility properties during operation.

The main failure modes of these elements are either related to a lack of the cladding ductility under imposed deformation (corrosion degradation or irradiation hardening), or an increase in the thermal resistance between the fuel and the coolant (for example resistive corroded zone on the cladding, decohesion between the fuel and the cladding with a clearance being formed by local buckling of the cladding) causing an increase in the fuel temperature and release of fission gases and internal pressure in the cladding building up causing failure by unstable deformation of the cladding.

The cylindrical elements comprise for example cartridges used in graphite/gas reactors, rods used in pressurised water reactors (PWR) or pins in fast reactors (FR).

There is a radial clearance inherent to the construction of these cylindrical elements between the fuel in the form of pellets and the cladding inside which the pellets are stacked, which allows accommodation of differential deformations between the fuel material and the cladding; this clearance is capable of at least compensating for differential expansions during the first power buildup of the element and the proportion of swelling of the fuel that cannot be resorbed by itself by creep and redensification on its internal cavities, in other words cavities composed of the central hole and its pores. The fuel material must also operate at a temperature at which it can activate these mechanisms for accommodation of its deformations.

On the other hand, it releases some of its fission gases.

A second expansion volume is formed in the cladding at the end of the stack of fuel pellets in order to limit the internal pressure in the element.

The main optimisation parameters of these cylindrical elements are the initial radial clearance between the fuel and the cladding, in other words the radial clearance at assembly, the quality of the fluid making the thermal connection between the fuel and the cladding (gas seal or molten metal seal), the effective filling density of the fuel in the section of the cladding defined by the radial clearance, pores, voids such as the central hole and/or lenticular dishings at the longitudinal ends of the pellet, the stiffness of the cladding (thickness) and the mechanical properties (maximum strength and ductility) and behaviour laws (swelling and creep) of the cladding and fuel materials.

The radial clearance between the pellet and the cladding full of gas and the thickness of the cladding form a radial thermal resistance that controls the heat transfer between the coolant and fuel pellets.

The thermal resistance is variable during operation because there is a variation of the radial clearance and degradation of the conductivity due to the release of fission gases. This variation in the thermal resistance complicates control over the maximum fuel temperature, which is controlled by the fact that the fuel material must not reach its melting point under any operating situations. Furthermore, use of this type of element in a "pressure containment" implies the use of material capable of holding the element mechanically in place with no risk of sudden failure (instantaneous and/or delayed) under pressure. To achieve this, the circular section is usually adopted because it has the best resistance to pressure; thus in a situation of mechanical interaction between the fuel and the cladding, the cladding opposes high hoop stiffness by being in hoop tension, the fuel is then blocked in its two radial directions and only its axial direction is partially free, this partial freedom depending on the adhesion between the pellets and the cladding.

This circumferential pressure applied by the cladding on the fuel activates its re-arrangement mechanisms on itself, in other words redensification on itself.

Therefore the choice of the cladding material is of overriding importance because it must provide sufficient ultimate strength in the targeted operating temperature range, ductility in plasticity and thermal creep and sufficient toughness, typically more than 20 MPa. $\sqrt{m}$ within a temperature range corresponding to the entire range in which fuel elements operate. Therefore limiting operating conditions of these elements (temperature and power per unit volume) are fixed by the choice of the cladding (instantaneous ultimate strength and creep strength as a function of the temperature) and the fuel material (melting temperature).

The main residual failure mode associated with this type of element is the mechanical instantaneous interaction between the fuel and the cladding exceeding the deformation capability of the cladding, for example in situations in which reactor power rises to a higher level than the previous operating level or in an operating condition in which the fuel temperature does not activate its mechanisms of auto-accommodation of its own deformations or only activates them slightly.

Finally, in spherical elements such as elements comprising particles used in high temperature reactors (HTR), different coating layers are successively deposited on a fissile core that must be centred. This is achieved by creating voids in the form of pores within the fissile core and in an intermediate layer called the "buffer" with very high porosity, and that maintains the initial continuity between the fissile core and the cladding layers.

Differential deformations between the fuel and the cladding, in other words the coating layer, are accommodated by filling in the voids; during operation, progressive densification of the buffer under neutron flux releases a radial clearance that prevents strong mechanical interaction between the fissile core and cladding layers. Furthermore, free internal volumes in the cladding retain fission gases released by the fissile material; the spherical shape of the cladding is then well adapted to resist the internal pressure that builds up.

Elementary particle optimisation parameters are essentially in the choice of the materials (nature, structure, properties and behaviour laws under neutron flux and temperature) and the thickness of the different layers.

These spherical fuel elements are only used in high temperature thermal flux and gas cooled reactors (HTR).

Their main residual failure mode corresponds to strong interaction between the fissile core and the cladding layers (creation of tension in imposed deformation of the cladding) that can cause failure of the confinement cladding; from this point of view, the worst shape of the cladding is spherical because it leaves no direction for deformation of the fuel material (beyond its maximum densification), to relieve interaction forces (creation of hydrostatic pressure in the internal volume of the cladding).

This type of spherical fuel element is also used in miscellaneous composite forms diluting the particles with a very small content of the fissile material in the reactive volume of the reactor per unit volume, of the order of a few %, in a matrix through which heat is transferred to the coolant. Furthermore by design, the risk of a cladding failure at high values of nuclear combustion (or burnup) is reduced.

Thus, considering the above, the inventor considered that each of the three types of fuel element has its own advantages that can summarised as follows:

plates have good heat transfer and accommodation qualities when there is mechanical interaction between the fuel pellets and the cladding, cylindrical elements (rods) and spherical elements have good resistance to pressure from gas fission products.

On the other hand, considering the above, it can also be seen that the currently used cylindrical type element (rod) has the major disadvantage that its thermomechanical behaviour when there is a mechanical interaction between the fuel pellets and the cladding may be uncontrollable.

Therefore, the inventor sets himself the prime objective of improving the thermomechanical behaviour of rod type fuel elements in the presence of mechanical interaction between fuel pellets and the cladding, currently used in $2^{nd}$ and $3^{rd}$ generation reactors.

These new elements could also be used for $4^{th}$ generation gas fast reactors.

A more general purpose of the invention is to propose a rod type fuel element that combines the advantages specific to the different types of existing fuel elements like those mentioned above, and that would make it possible to satisfy the following specification:

1/ reach fuel fractions per unit volume equal to fuel fractions used in existing rods with circular section, 2/ achieve optimum heat transfer from fuel pellets to the coolant throughout the life, and achieving values comparable to heat transfer with a plate (exchange preferably on 2 opposite faces), 3/ avoid the risk of a cladding failure by controlling the mechanical interaction between fuel pellets and the cladding.

Another purpose of the invention is to propose a rod type fuel element for which the fabrication process is not completely foreign to the industrial facility that has been set up to fabricate current rod type fuel elements with a circular section.

PRESENTATION OF THE INVENTION

To achieve this, the purpose of the invention is a nuclear fuel rod extending along a longitudinal direction comprising a plurality of fuel pellets stacked on each other and a cladding made of a material transparent to neutrons surrounding the stack of pellets, in which in the section transverse to the longitudinal direction:

the cladding is elliptical in shape and the inside surface has a major axis with length 2*a and a minor axis with length 2*b, each nuclear fuel pellet is generally elliptical in shape truncated at the ends of the major axis of the cladding, the minor axis of each pellet being of length 2*b' equal to length 2*b of the minor axis of the inside surface of the cladding except for the assembly clearance j of the pellets in the cladding, the difference in length between half of the truncated major axis of the pellets and half of the major axis of the cladding (c-a) being very much larger than the assembly clearance.

For the purposes of this invention, "very" much larger than the assembly clearance means a value larger than an assembly clearance such that void volumes can be arranged to enable the fuel to swell without any circumferential interaction with the cladding as explained below.

To achieve the solution according to the invention, the inventor attempted to identify mechanical phenomena that occur in the case of uncontrolled pellet/cladding mechanical interaction, in other words in instantaneous mechanical interaction situations beyond the deformation capability of the cladding.

These situations may occur for example when the power in the reactor builds up to a level greater than the previous operating power or in an operating condition in which the fuel temperature does not activate its re-arrangement mechanisms on itself, in other words auto-accommodation of its own deformations, or activates them only slightly.

In these situations, an existing fuel rod with a circular section has very strong mechanical interaction between the pellets and the cladding. The solid circular pellets in these situations have a thermal gradient that decreases from their centre towards their periphery; in other words, the cold periphery of the pellet imposes a radial stiffness that forms a sort of hoop binding stiffness. Furthermore, since the pellet is only very slightly accommodating by itself, there is no radial flexibility. Thus in these situations, the cladding has a hoop binding stiffness called the membrane stiffness imposed by the larger proportion of radial deformations of the fuel pellet. In other words, hoop binding occurs in this radial interaction direction. The pellet then only has one possible direction of relaxation, namely the axial or longitudinal direction, which enables local creep towards the dishings formed for this purpose at the ends of each pellet.

The inventor also reached the conclusion that the following solutions will have to be implemented if the thermomechanical behaviour of a fuel rod is to be improved in a situation with very strong pellet/cladding mechanical interaction:

reduce the stiffness of the cladding by changing its hoop binding method, ovalling of the cladding in the case of a circular section. The mechanical radial pellet/cladding interaction has to be made non-axisymmetric. Therefore, an initially oval section has to be defined with a possible mechanical contact between the pellets and the cladding only in the direction of a small diameter and space has to be created to allow movement, in other words expansion of the fuel, between the pellets and the cladding in the direction of the major diameter, correspondingly reduce the stiffness of the cold periphery of the pellet by making it oval in shape which means that the interaction surfaces can be localised making them only orthogonal to the small diameter by stressing the pellet in an ovalling mode, create a non-axisymmetric thermal gradient of the pellet, by having a thermal gradient more like that of a plate cooled on two faces. A non-axisymmetric thermal gradient of the fuel can reduce the hoop stiffness of the cold periphery of a currently used pellet with a circular section, by creating hotter portions at the ends of the major axis of the oval pellet. This thermal effect contributes to the reduction in the ovalling stiffness that the pellet will have along its minor axis, create a larger volume of voids in the cross-section so that the fuel that swells and expands can re-arrange itself by creep in its own section without generating any other stress or pellet/cladding interaction. This re-arrangement by creep is only possible if these voids are adjacent to the hottest portions of the pellet and the reaction forces applied to the pellet during a pellet/cladding interaction act on these hottest portions, maintain the mechanical equilibrium of the cross-section of the rod to which external coolant pressure is applied. Under very strong pellet/cladding mechanical interaction conditions, the resulting ovalling stiffness must be sufficient to maintain the geometry of the cross-section in stable equilibrium.

The inventor also proposes firstly to make the cross section of the fuel rod elliptical to improve its thermomechanical behaviour in situations of mechanical interaction between fuel pellets and the cladding.

The inventor then attempted to understand other phenomena that occur in nuclear fuel elements during normal operation of the reactors in which they are used.

In existing reactors such as pressurised water reactors, the rod type fuel elements are composed of circular cylindrical shaped fuel pellets stacked individually on each other and placed inside cladding in a tube longer than the stack, to leave expansion volumes necessary to limit progressive increase in pressure in the stack of fuel elements under the effect of release of fission gases, at the ends of the column.

Heat transfer between fuel pellets and the coolant takes place radially through a thermal resistance composed of the radial clearance between the pellets and the cladding at assembly filled with gas at the beginning of life, and the thickness of the cladding.

Controlling this thermal resistance throughout the life of the element guarantees that acceptable fuel temperature limits are respected. The inventor thus considered that the following factors have to be adopted for the design of new fuel rods:

heat transfer through a radial gas seal calibrated at the beginning of life, free volumes formed in the direction transverse to the direction of heat transfer.

Usual plate type fuel elements are capable of accommodating deformations imposed by the fuel through "ductility" of their cladding with very low stress in the cladding, while maintaining heat transfer in the direction of the deformation. The inventor thus believed that fuel elements have to be made very slender, in other words they need to have a high width to thickness ratio so that they can accommodate deformations imposed by the fuel in the direction of the thickness at a very low stress in the cladding.

Consequently, the inventor reached the conclusion that a fuel rod with an elliptical section according to the invention must advantageously use the three solution factors mentioned above, in other words it must have:

an elliptical cross-section with its major axis with length 2*a and minor axis with length 2*b with a slenderness factor of the section equal to a/b, the shape of the pellet should also be elliptical creating a radial clearance in assembly between the pellets and the calibrated cladding comparable to what already exists in standard rods with a circular cross-section, the presence of free volumes at the ends of the major axis of the pellet obtained by truncating said axis.

The inventor thus arrived at the solution disclosed in the invention, namely pellets with an elliptical cross-section truncated along their major axis stacked individually on each other in an elliptically shaped cladding with a radial clearance formed during assembly along the non-truncated portion of the pellets, and fission gas expansion chambers at the truncated ends.

The result obtained with this new rod cross-section is the targeted improvement in the thermomechanical behaviour under very strong mechanical interaction between the pellets and the cladding since:

the interaction is limited to the portions of the pellet/cladding mechanical contact orthogonal to the minor axis of the cross-section enabling the cladding to accommodate deformations imposed by the pellet by reducing its ovality and thus only generating bending stresses within the thickness of the cladding located in its end portions along its major axis 2*a, a temperature gradient in the pellets facilitating a more flexible mechanical behaviour of the pellet during interactions, the combination of the generally elliptical shape of the pellet and the presence of large gas seals at its major axis ends creates heat exchanges preferentially oriented along the direction of the minor axis with a hot core of the pellet extending along the major axis and the cold peripheral parts limited to portions in contact with the cladding. The mechanical stiffness that the pellet forms during an interaction in the direction of its minor axis will be very much reduced by the almost complete absence of an arch effect created by the cold peripheral portions of the pellet, the local resistance to heat exchange between the pellets and the cladding at the truncated ends of the pellet, in other words along the major axes, increases the temperature of surface portions of the pellet in this zone. Thus, in a mechanical interaction with the cladding, the fuel pellet is subject to compression essentially along its small diameter, the presence of a hot zone as far as its surface at the ends of the major axis, means that it can deform by creep preferentially along this axis. This degree of freedom in extrusion by creep towards the transverse end voids enables the pellet to accommodate its volume increases by deformation of creep preferentially along this direction, correspondingly minimising the deformation imposed by the mechanical interaction with the cladding along its minor axis.

Those skilled in the art will attempt to achieve geometric stability of the elliptical section of the rod under the action of pressure forces external to the coolant applied during normal operation of a reactor in which the rods according to the invention are used, by adjusting the stiffness parameters applied by the fuel pellet to oppose flattening of the cross section.

These parameters can be defined as follows:

the slenderness factor of the cross-section (ratio between the major and minor axes) controls the thermal properties of the pellet and therefore its stiffness to compression along its minor axis, the dimensions of the transverse end cavities along the major truncated axis c of the pellet control the temperature and therefore the creep deformation rate of the pellet along this direction (stiffness against extrusion towards the cavities partly determining the stiffness of the pellet to compression along its minor axis).

Therefore the new rod geometry proposed by the invention gives geometric stability of the cross-section guaranteeing control over the gradient and heat exchanges of the pellet during normal operation while enabling accommodation of deformations imposed by the pellet onto the cladding under a mechanical interaction situation by adjusting the slenderness factor of the section and by the design of truncation of the pellet and therefore dishings at the ends, which minimises stresses in the cladding due to the distribution of imposed deformations between the pellet and the cladding and due to the way in which the cladding is stressed in bending by ovalling.

Preferably, the assembly clearance j of the pellets in the cladding over the length of the truncated major axis c is less than or equal to 10% of the length of the major axis 2*a of the cladding.

When the rod according to the invention is designed for a pressurised water reactor (PWR), the cladding is preferably made of a zirconium alloy or an M5 alloy (ZrNbO), and the fuel pellets are preferably made of ceramic materials such as $UO_2$, $(U, Pu)O_2$, or a mixture based on uranium oxide and retreated plutonium oxides.

When the rod according to the invention is intended for use in a gas-cooled fast reactor (GCFR), the cladding is preferably made of a refractory or semi-refractory metallic material, for example like Vanadium-based alloys or a ductile ceramic, for example such as MAX-phases of the $Ti_3SiC_2$ type, and the fuel pellets are preferably made of ceramic materials like $(U, Pu) C$, $(U, Pu)O_2$.

The invention also relates to a nuclear fuel assembly comprising a plurality of fuel rods like those described above and arranged together in a lattice.

The invention also relates to cladding made of a material transparent to neutrons extending along a longitudinal direction and with an elliptical section transverse to its longitudinal direction.

The invention also relates to a nuclear fuel pellet that extends along a longitudinal direction and with a generally truncated elliptical shape with a truncated major axis in the section transverse to its longitudinal direction.

The invention also relates to a method of manufacturing a fuel pellet with height H along its longitudinal direction and with a generally truncated elliptical shape with a truncated major axis with length 2*c and a minor axis with length 2*b' in its section transverse to the longitudinal direction, in which the following steps are performed:

prepare the fuel powder in the so-called pelleting step, compress the fuel powder on the edge of the raw pellet, in a set of dies with height H and with a truncated elliptical cross section with a major length 2*c and a minor length 2*b', sinter the compressed fuel pellet.

Note that the term "raw pellet" means a pellet that has not been sintered.

Advantageously, the H/(2*c) ratio between the height H and the major length 2*c is equal to at least 1.2.

Thus, the new fuel rod geometry disclosed according to the invention also enables potential improvements in terms of fabricating the fuel rods. The truncated elliptical shape of the cross-section of the fuel pellets means that the two improvements in the manufacturing method described above can be envisaged as formulated differently below:

concerning the pellet compression method: the new shape of the pellets means that the compression axis could be along the direction of the minor axis of the elliptical section (instead of a compression axis along the axis of the cylinder as it is for known pellets with a circular section). This new compression method can give better control over uniformity of the compression density and therefore the geometry of the sintered pellet, elimination of grinding to adjust the pellet diameter: the new elliptical shape of the cross-section of the rod means that the cladding is forced into contact onto the faces of the pellet (orthogonal to the minor axis) due to the effect of external pressure the first time that the coolant temperature rises in the reactor. Therefore, the thermal properties of the pellet are insensitive to the initial assembly clearance between the pellets and the cladding. Thus, unlike the situation in the state of the art, there is no need to adjust the pellet dimensions since the geometric tolerances obtained by sintering become acceptable (particularly with the improvement in the compression method envisaged above).

The invention also relates to a method of stacking fuel pellets in a cladding made of a material transparent to neutrons so as to make a nuclear fuel rod, in which as-sintered fuel pellets made directly using the fabrication process described above are stacked inside a generally elliptical shaped cladding in which the length of the minor axis of the inside surface is equal to 2*b and is the same as the length 2*b' of the minor axis of the pellets except for the assembly clearance, the difference in length between half of the truncated major axis of the pellets and half of the major axis of the cladding (c-a) being very much larger than the assembly clearance j.

BRIEF DESCRIPTION OF THE DRAWINGS

Other advantages and characteristics of the invention will become clearer after reading the detailed description of a nuclear fuel rod according to the invention with reference to FIGS. 1 and 1A given below among which:

FIG. 1A is a cross sectional view of the nuclear fuel rod shown in FIG. 1, FIG. 2 is a perspective view of a nuclear fuel rod according to the invention, FIG. 3 is a perspective view of a cladding conforming with the invention in which a stack of pellets according to FIG. 2 will be placed.

DETAILED PRESENTATION OF PARTICULAR EMBODIMENTS

Figure 1:
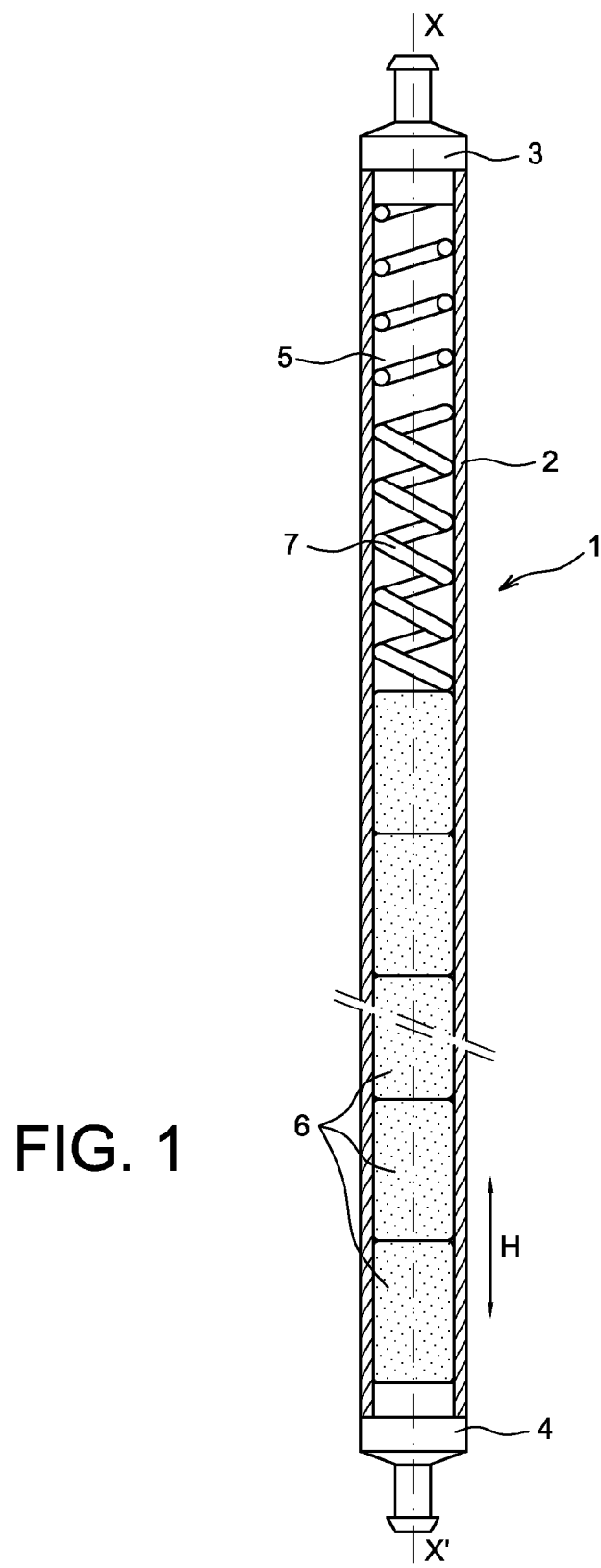
FIG. 1 is a longitudinal partial sectional view of a nuclear fuel rod according to the invention.

For reasons of clarity, the longitudinal axes along which the pellets 6 and the cladding 2 and the rod 1 composed of these elements will extend, are all referenced XX'.

Note that:

dimensions a and b are inside dimensions of the elliptical cladding 2, dimensions A and B are outside dimensions of the elliptical cladding 2, dimensions a' and b' are applicable to a non-truncated pellet 6, dimension 2*c is the major length of the fuel pellet 6 truncated according to the invention.

FIG. 1 shows a nuclear fuel rod 1 according to the invention represented in its configuration ready for use in a nuclear reactor, in other words in the vertical position with pellets 6 near the bottom part as specified below.

The rod 1 is composed of a cladding 2 made of zirconium alloy closed at each of its ends by an upper plug 3 and a lower plug 4.

The inside of the cladding is essentially divided into two compartments, one 5 of which is in the top part forming a gas expansion chamber, and the other 6 houses the fissile column formed by the stack of nuclear fuel pellets 6, each of which extends along the longitudinal direction XX' of the rod 1.

In the stack shown, each pellet 6 has approximately the same height H.

A helical compression spring 7 is placed in the expansion chamber 5 with its lower end bearing on the stack of pellets 6 and its other end bearing on the upper plug 3.

This spring 7 holds the stack of pellets 6 in position along the longitudinal axis XX' and "absorbs" longitudinal swelling of the pellets 6 during time, and it also prevents buckling of the cladding section in its ovalling mode.

In other words, it prevents extreme ovalling of the cladding section.

FIG. 1A shows a straight cross-section of the rod 1 in FIG. 1.

Cladding 2 according to the invention has a constant thickness around its entire periphery and is generally elliptical in shape. More precisely, the inside surface 200 of the elliptical shaped cladding 2 has a major axis with length 2*a and a minor axis with length 2*b.

The fuel pellet 6 also has a truncated elliptical shape at each end of the major axis of the cladding. In other words, the pellet 6 has a truncated major axis with length 2*c and a minor axis with length 2*b'.

Note that the dimension c defines the distance of the truncation plane of the pellet 6 from its centre.

A uniform radial assembly clearance j between the pellet 6 and the cladding 2 is defined on the elliptical sides of the pellet, in other words over the entire length 2*c of the pellet. In other words, once fabricated and before use as a fissile material in a nuclear reactor, each fuel pellet 6 has a truncated elliptical cross-section in which the length of the half minor axis b' is approximately equal to the length of half the minor axis b of the inside surface 200 of the cladding 2, except for the assembly clearance j.

Free volumes or expansion voids 60 are thus located at the two ends of the truncated major axis of the pellet 6, in other words between the truncated edges 61 of the pellet 6 and the inside surface 200 of the cladding 2.

Thus, the parameter settings for the cross section of the fuel rod 1 are expressed based on the characteristics of the pellet 6 defined as follows:

its ovalling factor or slenderness factor "a'/b'", where a'=a-j, its truncation ratio "c/a".

The inventor considers that the slenderness factor a'/b' should be equal to at least 1.5 in order to achieve satisfactory thermal behaviour, typically values for a plate as disclosed in application WO2007/017503.

It would be possible to use the rod 1 with an elliptical section according to the invention in two categories of nuclear reactors functioning with a core coolant maintained under higher pressure than the fuel elements.

The first targeted application is use specific to operating conditions in pressurised water reactors (PWR).

The rod can then a priori be made from the same constituent materials as those used for the design of existing standard fuel elements, such as rods with a circular section like those known at the present time; zirconium alloys or an M5 alloy (ZrNbO) for the cladding and $UO_2$ ceramic or a mixture based on uranium oxide and retreated plutonium oxides for the fuel pellets.

The second targeted application is use specific to gas-cooled fast reactors (GCFR), conditions under which cladding temperatures are high within the range from 300° C. to 900° C. and the fast neutron fluence is high. The constituent materials used to make the rod can then be refractory or semi-refractory metal such as Vanadium based alloys or ductile ceramic, like MAX-phases of the $Ti_3SiC_2$ type for the cladding and ceramic (U, Pu) C or (U, Pu) $O_2$ for the fuel pellets.

One particular embodiment of a rod with an elliptical section according to the invention is described below. In this embodiment, the rod 1 is designed to satisfy operating conditions of a standard pressurised water reactor (PWR).

The geometries, materials and operating conditions of a standard PWR reactor used for reference purposes are as follows:

Dimensions of a rod with known circular section:
Cladding: outside diameter Dext=9.5 mm,
inside diameter Dint=8.36 mm,
Fuel pellets: diameter=8.2 mm,
Materials:
Cladding made of M5 alloy,
$UO_2$ fuel pellets,
Operating Conditions:
Temperature at the outside surface of the cladding, T=342° C., Coolant pressure P=155 bars,
Power per unit volume of the fuel=320 W/cm³,
Burnup rate=60 000 MWd/t.

Based on these reference data for a rod with a known circular section, the inventor proposes the following dimensions for a new elliptical rod according to the invention:

section of the pellet the same as a pellet with standard circular section;
ovality factor a'/b'=1.8;
truncation ratio equal to c/a'=0.9, namely the following dimensions a', b', c as shown for rod 1:
a'=5.61 mm;
b'=3.115 mm;
c=5.05 mm.
cladding thickness 0.57 mm equal to the thickness of the standard section cladding;
radial assembly clearance equal to the radial assembly clearance between the pellets and the cladding in a rod with a standard circular section in which j=0.08 mm (this assembly clearance j between pellets 6 and cladding 2 in the rod according to the invention is measured along the minor axis b of the ellipse in which the dimensions of the elliptical section of the cladding are as follows:

large inside diameter 2*a=5.69 mm;
small inside diameter 2*b=3.195 mm;
large outside diameter 2*A=6.26 mm;
small outside diameter 2*B=3.765 mm.

In comparison with the reference geometry of a rod with a standard circular section for a pressurised water reactor (PWR), the total section of the rod 1 with an elliptical section according to the invention is increased by the order of 4.4% and the area of the fuel occupies about 92.5% of the cladding.

Thus, the total void j, 60 composed of the initial radial assembly clearance j between the pellets 6 and the cladding 2 and by truncations 61 of the ends of the pellet 6 (void space 60 between truncated edges 61 and the inside surface of the cladding 20) represents about 7.47% of the internal cross-section of the cladding equal to $\Pi*a*b$.

There are no particular fabrication problems in making cladding 2 with an elliptical section.

A different compression operation could also be envisaged to make the pellet 6. The slenderness a'/b' considered in the invention equal to 1.8 with the dimensions given above, means that it would be possible to envisage compression of each pellet orthogonally, in other words along the direction of the minor axis a' of its elliptical section or in other words on its edge delimited by its height H, instead of along its cylindrical axis XX' as is done at the moment for rods with a circular cross section.

The elliptical shape of the cladding also means that as-sintered pellets can be put in the cladding. The inventor believes that compression of the fuel pellet along its edge H must result in less dispersion of thicknesses of sintered pellets due to better uniformity of the compression densities within the pellet.

As mentioned above, during operation of a PWR reactor, the elliptical shape of the cladding will mean that contact will be made between the faces of the pellets and the cladding (except at the end voids 60), in other words over the entire length 2*c, as soon as the coolant is pressurised.

Even at the beginning of its life, the thermal properties of the pellets 6 no longer depend on the initial assembly clearance between the pellets 6 and cladding 2.

The analysis of the thermal and thermomechanical behaviour of a rod 1 with an elliptical section according to the invention under PWR reference operating conditions was made by digital simulation using the CAST3M finite element program.

This simulation was based on the assumption of constant fuel power throughout the life, a variation in the physical properties of M5 cladding materials and the $UO_2$ fuel as a function of the temperature, the viscoelastic behaviour of the cladding material and the fuel (thermal and irradiation creep), swelling of materials under irradiation and a release rate of fission gases produced by the fuel of the order of 6% (which is a typical value found for rods with circular section for burnup of 60000 MWd/t).

The results show the following for operation with this burnup rate of 60000 MWd/t:

good control of fuel temperatures throughout its life; as soon as power is first generated, the radial clearance j between the pellets 6 and the cladding 2 closes and the maximum fuel temperature changes between a life start temperature of 683° C. to a life end temperature of 904° C.

This change is due to a deterioration in the conductivity of the fuel by irradiation and presence of fission gases released by the fuel that degrade the heat exchange coefficient between the pellets 6 and the cladding 2.

Due to the elliptical shape of the section, since the size of the pellet along the direction of the heat exchange (its small diameter) is smaller than the diameter of a circular pellet with the same surface area, the maximum temperature inside the fuel is lower than in a rod with a standard circular section.

good global thermomechanical behaviour on the cross-section of the fuel pellet.

This provides control over deformations of the section, since creep of the elliptical section of the fuel pellet is controlled by the surface temperature achieved due to the thermal resistance formed by the voids 60 created at the truncated ends 61 of the pellet.

At the start of life, the local temperature increase (at the edges 61) is 136° C. higher than the temperature of the exchange surfaces (at portions 62) in contact with the cladding.

At the end of life, the local temperature increase (between the truncated edges 61 and portions 62) is 220° C.

This thermal equilibrium that controls the mechanical stability of the section is obtained by optimising the geometric parameters of the section, namely its ovality factor a/b and its truncation ratio c/a. Obviously, these parameters depend on each use and their optimisation depends on operating conditions of each fuel pellet and the mechanical properties of the component materials, and particularly thermal creep and irradiation behaviour laws.

Good thermomechanical behaviour also results in good control over the internal pressure in the rod created by fission gases released by the fuel.

The presence of voids 60 at the truncated ends 61 of the pellet forms additional expansion chambers that are not present in a rod with a standard circular section.

Finally, the good thermomechanical behaviour creates mechanical interaction between the pellets 6 and the cladding 2 that bends the cladding.

The induced bending stresses are located in the end sectors 200 of the cladding facing the truncations 61 of the fuel pellet.

Creep in the cladding 2 limits these stresses to values of less than 100 MPa during operation.

Therefore, the cladding is actually only stressed in bending on its ovalling mode; it is not subject to hoop binding mode as can happen with rod cladding with a standard circular section.

The deformations in the section of the fuel pellet 6 are adapted mainly by creep extrusion towards the end voids 60 under the action of ovalling stiffnesses of the truncated elliptical section of the pellet that thus oppose expansion and swelling deformations.

Other improvements and modifications could be envisaged without going outside the framework of the invention:

for application in pressurised water reactors (PWR) currently in service, it would be possible to use standard materials, namely a zirconium alloy cladding 2 and $UO_2$ fuel pellets 6, or a mixture based on depleted uranium oxides and retreated plutonium oxides, also called MOx. Rod performances can be optimised by controlling creep behaviours of cladding materials and the fuel in the rod with an elliptical section according to the invention, for application in gas-cooled fast reactors (GCFR), the use of a ductile cladding is desirable from the range of ductile metallic and ceramic materials as described above.

The invention claimed is:

1. A nuclear fuel pellet configured to be contained within an interior portion of a cladding, the interior portion having a generally elliptical cross-sectional shape with a major axis of length 2*a and a minor axis of length 2*b,
wherein the nuclear fuel pellet extends along a longitudinal direction (XX') and has a truncated elliptical cross-sectional shape in which:
a minor axis of the truncated elliptical cross-sectional shape is of length 2*b', with b' being less than b by an assembly clearance j separating the nuclear fuel pellet from the cladding at the minor axes and satisfying the relationship $b-b'=j$, and a major axis of the truncated elliptical cross-sectional shape is of length 2*c, with c being less than a by a substantially greater amount than the assembly clearance j such that a pair of expansion voids are formed in the interior portion of the cladding at opposite ends of the nuclear fuel pellet between the nuclear fuel pellet and the cladding when the nuclear fuel pellet is disposed in the cladding.

2. The nuclear fuel pellet of claim 1, wherein the truncation is in a ratio c/a'=0.9, wherein c is half the length of the nuclear pellet along a major axis of the truncated elliptical cross sectional shape and a' is half the length of the major axis of an elliptical cross section of the nuclear fuel pellet without truncation.

3. The nuclear fuel pellet of claim 1, wherein the truncation is in the form of a flat side portion of the ellipse intersected by the major axis.

4. A nuclear fuel pellet extending along a longitudinal direction (XX') and having a generally truncated elliptical shape with a truncated major axis in a section transverse to the longitudinal direction (XX'), the nuclear fuel pellet being configured for containment within an interior portion of a cladding, the interior portion having a generally elliptical cross-sectional shape with a major axis of length 2*a and a minor axis of length 2*b,
wherein a minor axis of the truncated elliptical shape is of length 2*b', with b' being less than b by an assembly clearance j separating the nuclear fuel pellet from the cladding at the minor axes and satisfying the relationship $b-b'=j$, and, wherein the major axis of the truncated elliptical shape is of length 2*c, with c being less than a by a substantially greater amount than the assembly clearance j such that a pair of expansion voids are formed in the interior portion of the cladding at opposite ends of the nuclear fuel pellet between the nuclear fuel pellet and the cladding when the nuclear fuel pellet is disposed in the cladding, and
wherein said generally truncated elliptical shape is truncated with a truncation ratio c/a less than 1.

5. The nuclear fuel pellet of claim 4, wherein the truncation is in the form of a flat side portion of the ellipse intersected by the truncated major axis.

* * * * *